I. W. KNOWLES.
SAGGER-PIN MACHINE.

No. 185,828. Patented Jan. 2, 1877.

UNITED STATES PATENT OFFICE.

ISAAC W. KNOWLES, OF EAST LIVERPOOL, OHIO.

IMPROVEMENT IN SAGGER-PIN MACHINES.

Specification forming part of Letters Patent No. 185,828, dated January 2, 1877; application filed November 25, 1876.

*To all whom it may concern:*

Be it known that I, ISAAC W. KNOWLES, of East Liverpool, Columbiana county, in the State of Ohio, have invented a new and useful Machine for Forming Sagger or "Placing" Pins for Placing Earthenware thereon, which improvement is fully set forth in the following specification, reference being had to the accompanying drawing.

The object of my invention is to rapidly form sagger-pins by cutting them, in place of molding or stamping them, as has been done heretofore.

Figure 1:
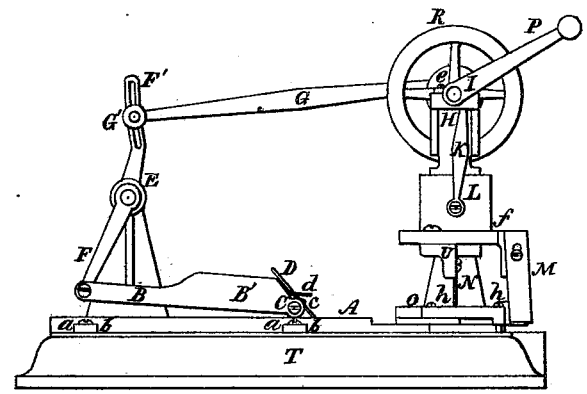
Figure 2:
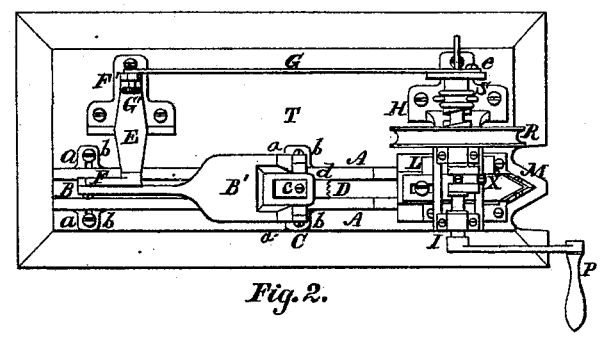
Figure 3:
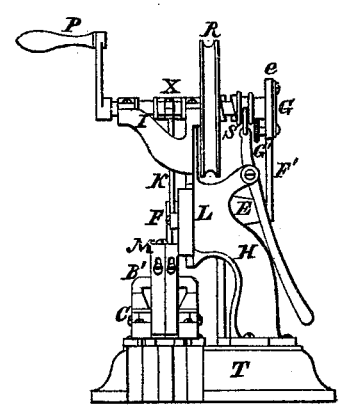
Figure 4:
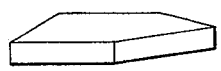

This I accomplish by the combination, in a sagger-pin machine, of the adjustable clay-bar guides A A, feed-bar B, and head B′, having the friction-roller C, and adjustable toothed plate D, rock-shaft E, and levers or arms F F′, connecting-rod G, upright or standard H, crank-shaft I, pitman K, slide-head L, knives M and N, (N being adjustable,) knife-guide and resisting-plate O, cranks P, e, and X, pulley R, loose on shaft I, clutch S, all attached or mounted on bed-plate T, as shown in front view, Figure 1 of the drawing, and further illustrated in plan view, Fig. 2, and end view, Fig. 3, Fig. 4 being a perspective view of one of the sagger-pins as formed by the machine.

The clay-bar guides A A are attached to the bed-plate T by the screws *a a a a*, which pass through the slots in the projecting lugs *b b b b*, so that the guides can be adjusted to the width of the bar, the space between the guides forming a trough, in which the clay bar from which the pins are cut slides. The tops of the guides A A are level, and form ways, on which the weighted head B′ of the feed-bar travels on the roller C. This roller has only a slight rotary motion, and by this motion elevates or depresses the teeth of the plate D. This plate has a longitudinal slot in the center, and is attached to the roller C by a set-screw, *c*, through the slot, so that the plate can be adjusted to the thickness of the clay bar, the end having the teeth projecting down between the guides A A, and the upper end passing through the yoke *d*, which limits the motion of it and the roller C.

The rock-shaft E is mounted in suitable bearings behind the guides A A at the front end. The lever or arm F extends down to and pivots to the outer or rear end of the feed-bar B. From the other end of the rock-shaft E projects at right angle (upward) the arm or lever F′. This arm is longitudinally slotted, and to it is connected the connecting-rod G by a screw-pivot, G′, the nut of which is made with a large head, so that the pivot can be easily loosened, and moved up or down to increase or decrease the longitudinal motion of the feed. H is a standard attached to the bed-plate, and is situated at the front end of and behind the guides A A. It is mounted with two sets of pillow-blocks, which carry the crank-shaft I. On the rear end of this shaft is the crank *e*, to which connecting-rod G pivots and receives motion. About midway from end to end of the shaft is another crank, X, formed in the shaft, to which the pitman K connects, and extends to the slide-head L, which moves up and down on suitable guides on the face of the standard H. The slide-head L is of the shape shown in Figs. 1 and 2, having a projection, *f*, from the lower portion of its face, which gives attachment at the front to the V-shaped knife M. Directly back of this knife the projection is cut by a perpendicular longitudinal slot, through which a set-screw passes to connect the block U, which carries the flat knife N, which, by this arrangement, can be adjusted to cut the pins to the desired length. O is a compound plate, which rests on the front end of the guides A A, which are cut away to receive it. The lower part is halved out one-third of the width on each side, and one-half in thickness, and has longitudinal slots cut through each of the sides. The upper portion of the plate has a V-shaped projection at the front, which fits into and guides the V-shaped knife M. Back of this it is cut out in the center, that the center portion of the lower plate can slide into it when the knife N is moved forward to cut a short pin. The upper plate is also cut down in thickness, so that when the two are slid together the center portion of the upper is flush with the sides of the lower. This compound plate O has for its object, first, to guide the knives M and N, and, second, to resist or hold the clay bar down, and prevent any spalling of the edges when the knives are withdrawn from cutting or shaping a pin. The set-screws

*h h h h* hold the plate O in place. P is a hand-crank for giving motion to the machine when operated by hand. R is a pulley, by which it is operated by power when desired, S being a lever-clutch, by which the pulley is thrown in or out of gear on the shaft I.

It will be understood that crank *e* is placed on the shaft I with such relation to crank X that when the knives are descending and cutting a pin the feed-bar B is moving back, and when the feed is moving the clay bar up the knives are up and out of the clay.

Operation: The clay from which the pins are to be cut is first squeezed into lengths by forcing through a "dod" or die in a square box or tube to the width and thickness required for the pins. The guides A A are then adjusted to the width, and the knives M and N and the guide-plate O to the thickness, and also set to the length, of the pin, the feed being also adjusted to the pin-length by moving the connecting-rod pivot G′ up or down in the slotted arm F′. The clay bar or length is then pushed in between the guides A A, the knives M and N being up until the front end is under M, when the machine is set in motion, cutting one end of the pin sharp by the knife M, while knife N cuts it off the desired length. The feed-bar, retreating at the same time, starts to advance the instant the knives withdraw from the clay, which is held down by the plate O. The roller C, by its friction on the guides A A, turn the teeth of plate D down, so as to bite on the clay bar, and move it forward under knives M and N, the pin last cut being pushed out of the machine by each following one.

Having thus described my invention and its operation, what I claim is—

1. A machine having one or more knives for cutting and shaping sagger-pins from a clay length or its equivalent, for the object set forth.

2. A sagger-pin, when cut from a clay length, in manner as described.

3. The feed-bar B, having the head B′, roller C, plate D, and yoke *d*, all combined and operating as described, for the object set forth.

4. In a sagger-pin machine, the guides A A, in combination with one or more knives, as described, and for the object set forth.

5. In a sagger-pin machine, the compound knife-guide and resisting-plate O, as described, and in combination with knives M and N, for the object specified.

6. The combination of the elements A A, B, C, D, E, F F′, G, H, I, K, L, M, N, O, P, R, S, T, U, X, *e*, and G′, all constructed and operating as described, and for the object set forth.

ISAAC W. KNOWLES.

Witnesses:
N. T. ASHBAUGH,
JNO. N. TAYLOR.